Aug. 19, 1952   S. S. MILLEN   2,607,606
HAND TRUCK
Filed April 9, 1948   3 Sheets-Sheet 2
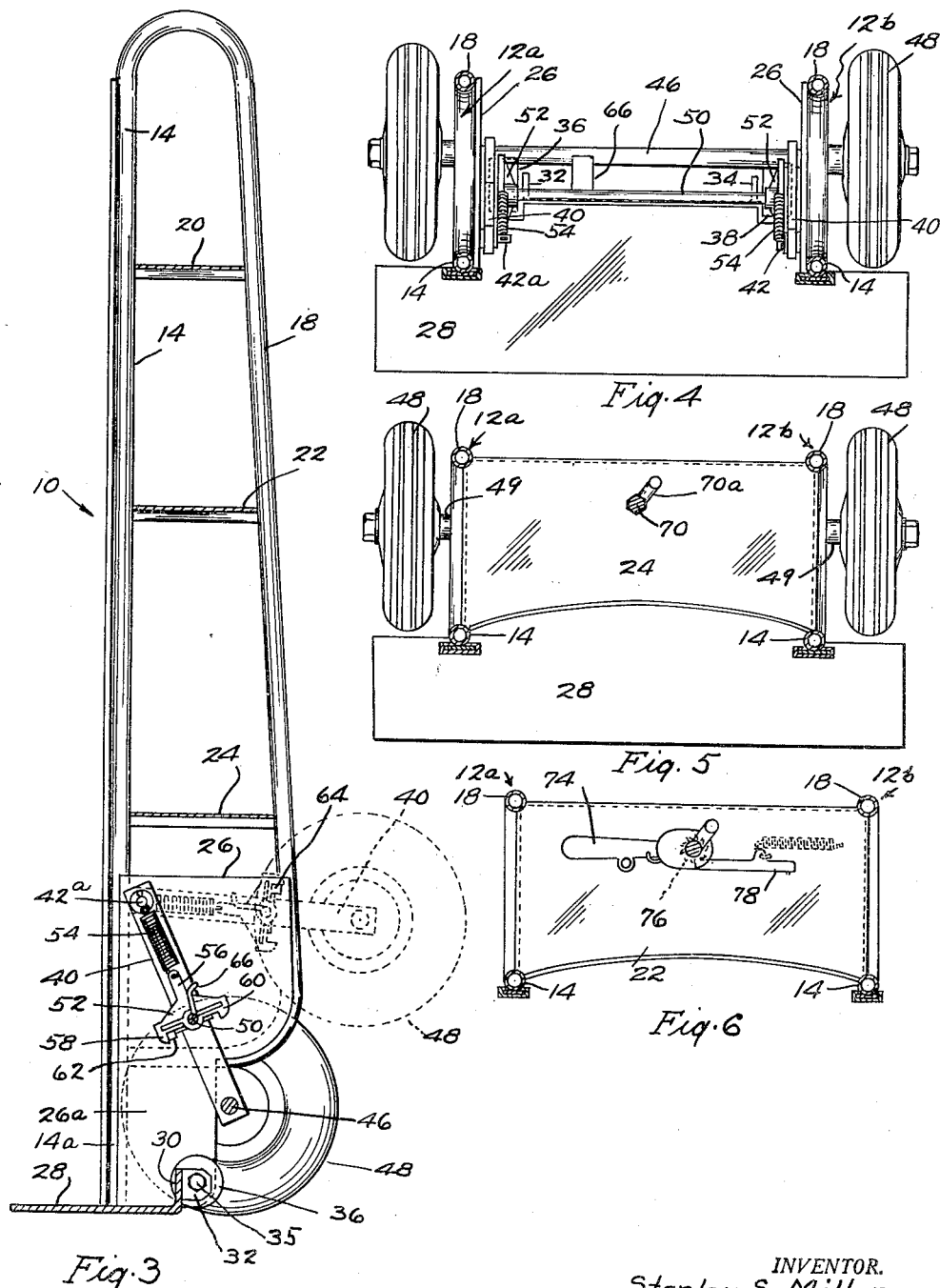
INVENTOR.
Stanley S. Millen
BY Aug. 19, 1952 S. S. MILLEN 2,607,606
HAND TRUCK
Filed April 9, 1948 3 Sheets-Sheet 3
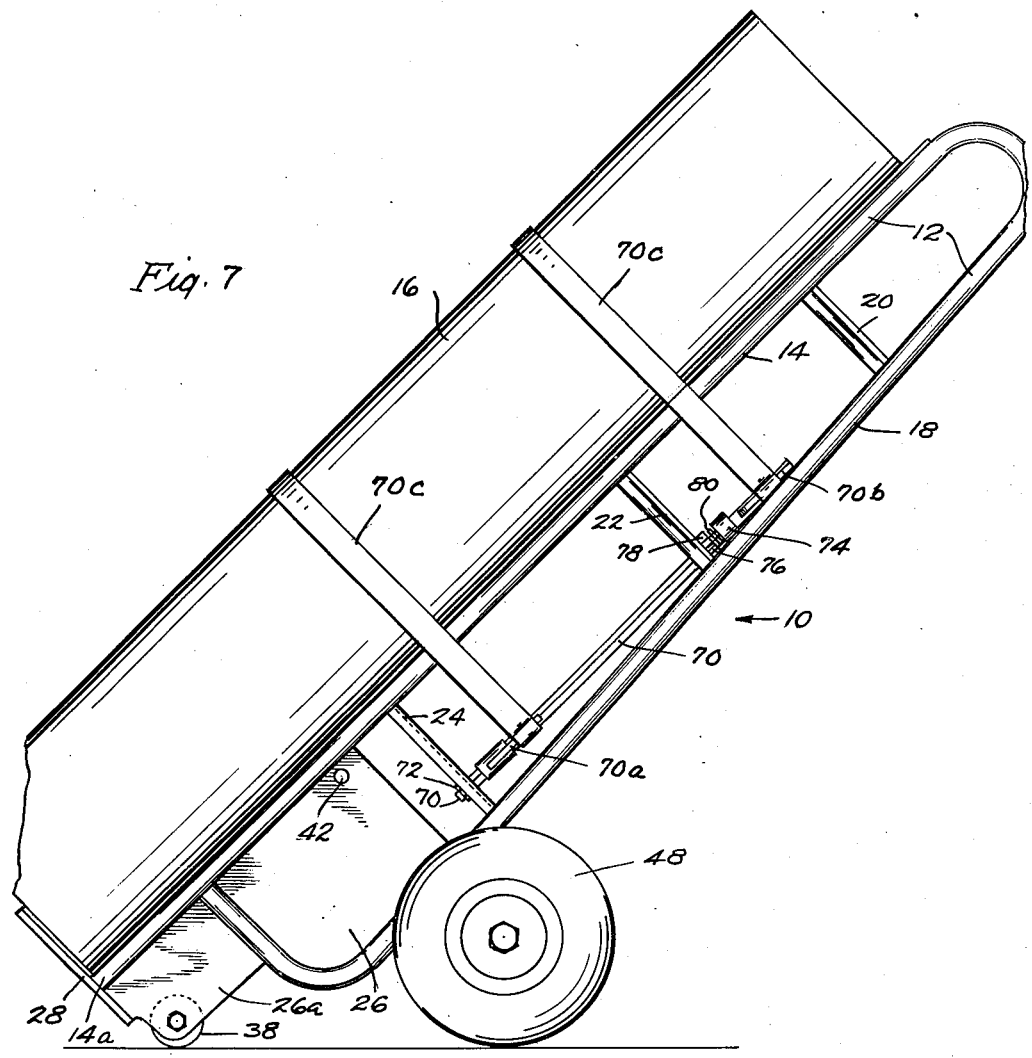
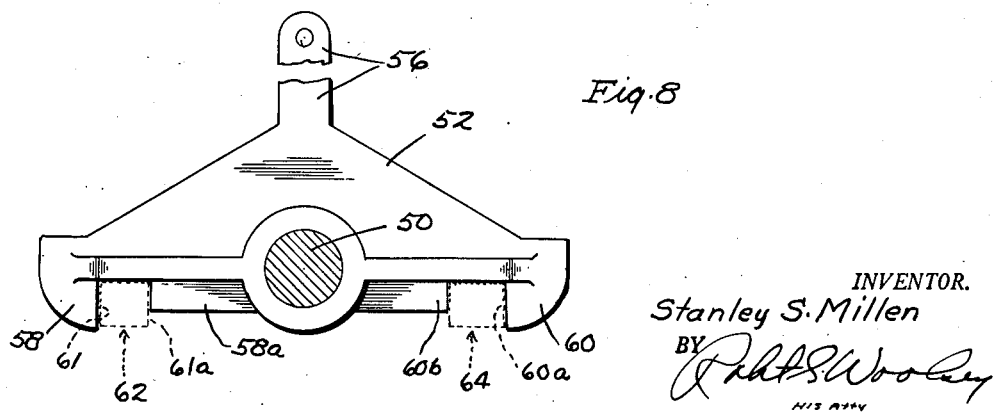
INVENTOR.
Stanley S. Millen Patented Aug. 19, 1952

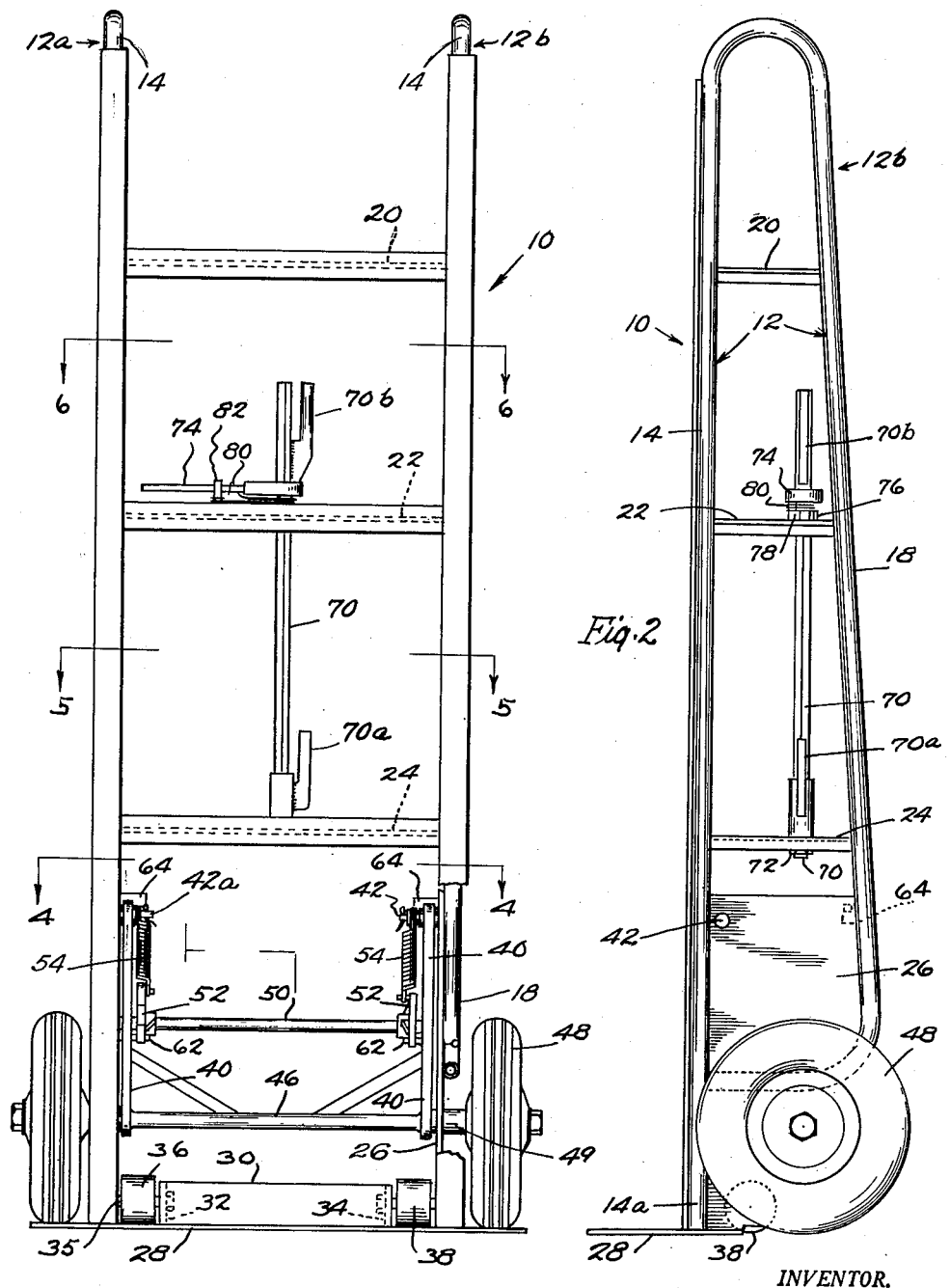

2,607,606

UNITED STATES PATENT OFFICE 2,607,606

HAND TRUCK

Stanley S. Millen, Glendale, Calif.

Application April 9, 1948, Serial No. 19,975

4 Claims. (Cl. 280—56).

The present invention constitutes an improvement upon my previously patented hand truck, Patent Number 2,096,994, dated October 26, 1937, and is adapted for use in connection with moving heavy and difficult to handle objects; such as refrigerators, hot water tanks, water softening tanks, washing machines, stoves, packing and shipping cases, and in general, goods of the aforementioned type which because of bulk, weight and contour, is difficult to handle; and in view thereof, the following may be mentioned as being among the objects of the invention.

(1) To provide a new and improved method of shifting the center of gravity of the load with respect to the wheels and axle whereby heavy and bulky loads may be handled with greater ease than heretofore.

(2) To provide new and improved load supports operating between the axle and truck chassis when in either of the functioning positions of the axle.

(3) To provide for increased rigidity and strength in the truck when under load.

(4) To provide a hand truck which is inherently balanced when upended and wherein the wheels and nose of the platform functionally operate to vertically support the truck when upended, whereby the truck may be safely stored in this position at a distinct saving over space normally occupied by trucks of this general classification.

(5) To provide new and improved means to tighten a strap placed around a load to be transported whereby the load cannot shift with respect to the truck.

(6) In general to provide a new and improved hand truck for moving goods and wares of the type aforementioned, and wherein strength, balance, flexibility and ease of operation are of prime consideration.

Other objects, including features of novelty and advantage may be noted from the accompanying specification and drawing.

In the drawing:

Figure 1 is a front elevational view showing the improved hand truck of this invention.

Figure 2 is a side-elevational view of the hand truck; and,

Figure 3 is likewise a side-elevational view, however, in this view the wheels of the truck are shown in extended position and in this position shows the cooperation existing between the pilot wheels and the main wheels of the truck in supporting a load imposed thereon.

Figure 4 is a transverse sectional view taken along line 4—4, Figure 1.

Figure 5 is also a transverse sectional view and is substantially that taken along line 5—5, Figure 1.

Figure 6 a view taken along line 6—6 Figure 1.

Figure 7 is a utility view showing the hand truck in side elevation with a burden secured thereon.

Figure 8 is a side-elevational view of the latch used to hold the wheel assembly in each of its positions, the view shows in detail the construction and relative position entering into the construction of the latch.

In the drawing, the reference character 10 indicates the hand truck of this invention which is shown as being formed with a frame 12 of reversely bent tubing, the upper parallel first rails 14 of which are adapted to support a load 16; while the lower parallel second rails 18 are reversely bent to a point adjacent the axle of the truck, and are then again bent to join the rails 14 and are welded thereto at a point inwardly of the end of the opposite rail, so that there remains a forwardly extending remainder rail portion 14a which terminates in flush contact with the toe plate 28, thereby forming frame elements 12a and 12b which are held in spaced position with respect to one another by means of the transverse plate 20, 22 and 24. Each of the frame elements 12a and 12b are fitted with a relatively heavy plate 26 welded thereto as shown in the drawing, the upper portion being shaped to conform with the contour of the lower part of the frame 12, while the lower part of the plates are formed with a rectangular extension 26a which is welded to the adjacent part of the rail 14 and to a transversely disposed platform 28 upon which the load 16 is adapted to rest in part as shown in Figure 7.

The platform 28 is formed with an upturned inner edge portion 30 from which ears 32 and 34 project, and which ears are adapted to journal one end of the shaft 35 of rollers 36 and 38 in conjunction with the plates 26 which form the support for the opposite end of the shafts 35.

A pair of arms 40 pivotally positioned upon studs 42—42a which projecting inwardly from the plates 26, have their opposite ends welded to an axle 46 upon which the wheels 48 are mounted. A tubular sleeve 49 placed around the axle between the point of connection with the arms 40 and the hubs of the wheels 48, provides a rest for the frame of the truck when used with the wheels in folded position.

A rock shaft 50 is positioned intermediately of the length of the arms 40 and is provided with a latch 52 adjacent each of the ends thereof, while balancing spring 54 attached to each of the studs 42 and 42a, and to an arm 56 extending from one of the latches 52 is adapted to restrict free oscillation of the latch and to effect retention thereof in equalized balance either of the extreme positions of the assembly which is swingable upon the studs 42.

The latches 52 upon the ends thereof are provided with lips 58 and 60, of which, lips 58 are adapted to slide over bosses 62 projecting inwardly from the inner faces of the plates 26, and to be retained thereon against free outward movement of the wheel assembly, while the lips 60 are adapted to slide over and be retained upon the bosses 64 when the wheel assembly is swung outwardly to fully extended position. A foot actuated trip 66 is fixedly secured to the shaft 50 and is adapted to rock the shaft to effect disengagement of the latch from the bosses 62 or 64 as the case may be, whereby the wheel and its assembly may be readily moved or swung on the studs 42, 42a to and from fully extended position as illustrated in Figure 7.

Bulky items of the character herein before mentioned are difficult to hold upon any hand operated truck, hence resort is constantly made to the use of woven fabric belts as a means of securing the load in place, however, it is not always possible to cinch a strap tight enough to fulfill the requirements imposed upon it, and to this end I have devised a simple and practical method of firmly securing a strap around the load and to the truck, and which may be released therefrom with equal facility.

The transverse plates 22 and 24 of the frame 12 center and support a length of hexagonal stock 70 which extending through the plate 22 is fitted with a ratchet wheel fixedly secured thereto, while the lower end of the hexagonal stock 70 is threaded and inserted through the plate 24 and thereafter, nuts 72 are screwed onto the threaded portion of the stock 70 in sufficient degree to remove lost motion or play from the stock 70 with respect to the plates 22 and 24. The upper, free end of the stock 70 is fitted with a reversible ratchet wrench 74 which is adapted upon rotation to revolve the stock 70 and the ratchet wheel 76. A spring resistant pawl 78 is pivotally positioned in the plate 22 and is adapted to hold the ratchet wheel 76 against reverse rotation, while a spring 80 placed between the wrench 74 and the ratchet wheel 76 and disposed around the stock 70, with one end attached to the wrench and the other end attached to a pin 82 secured to the plate 22, serves to return the wrench to a position longitudinally disposed across the width of the truck whereby when not in use the wrench is never projecting outwardly from the truck to interfere with the operator thereof or otherwise to cause injury or damage thereto or to other persons, equipment or goods. The upper and lower ends of the hexagonal stock 70 are provided with spaced, parallel fingers welded thereto and are adapted to engage the strap used to secure a load upon the truck as shown in Figure 7, thus when the wrench 74 is rotated clockwise, the fingers 70a and 70b will rotate with the stock 70 and will wind the holding straps there around until a sufficient degree of tightness has been obtained to properly secure the load. To release the strap 70c it is only necessary to reversely move the reversing lever of the wrench as is customary and usual in this type of wrench and to thereafter move the wrench counter-clockwise while at the same time disengaging the pawl 78 from the ratchet wheel 76 so that the central shaft 70 and the fingers 70a and 70b are reversely wound to free the strap or straps 70c. In general usage, the straps 70c are usually removed from the fingers 70a and 70b after being loosened, rather than to be unwound by use of the wrench as aforementioned.

The foregoing description of construction is believed to be replete in sufficient detail to enable those concerned to practice it, and likewise it is believed that functional operation and use of the invention will be readily apparent to those concerned, however before conclusion, it may be pointed out that if the truck is used with the wheels in nested position, the weight of the truck and its load is transferred through the plates 26 to the sleeves 49 and thence directly to the axle 46 and the wheels 48 and when in this position the arms 40 serve only to correctly align and position the axle 46 and wheels 48 thereon, while at the same time, the latches 52 moving with the arms 40 are so positioned that the lips 58 engage the bosses 62 upon the outer face 61 thereof while a shoulder or rib 58a upon each latch bears against an oppositely disposed face 61a upon said bosses, thereby steadying the whole of the truck frame with respect to the supporting axle and wheels.

Upon releasing the latches from engagement with the bosses 62 and movement of the arms 40 and the whole of the wheel assembly to extended position as shown in dotted lines in Figure 3 or in full elevation in Figure 7, the latches 52 will of course engage the bosses 64, the lip 60 overhanging the faces 60a of the bosses 64, while the shoulders or ends of the ribs 60b bear against the opposite faces of the bosses 64 thereby steadying the lower ends of the arms 40 when the truck is in this position, the weight of the truck and its load being referable to the studs 42, 42a upon which the arms 40 are swingably positioned.

It is believed that from the preceding description it will be apparent that I have conceived a novel, yet simple, practical and readily available means to transport that type of merchandise, which by its nature is difficult and cumbersome to move by currently available means, and thus having described my invention in its presently preferred form, that which I consider to be novel and patentable, is as follows.

I claim:

1. In a hand truck essentially comprising a frame and a pair of wheels for said frame, means to shift the operating position of said wheels whereby the gravitational center of said truck may be altered when in use, said means comprising a pair of arms pivotally attached to said frame for arcuate movement of said wheels and having an axle secured to the free ends of said arms for mounting said wheels, a shaft connecting said arms, a spring resistant oscillatable latch fixedly secured to said shaft, bosses projecting inwardly from said frame in paired relationship and so disposed with respect to one another as to be intersected by said latches in movement with said arms, each of said latches having an engaging lip and shoulder upon each of opposite ends thereof whereby upon movement of said arms and latches to a given pair of said bosses said latches will be engaged and retained by said given pair of bosses, and a manually operated lever on said shaft for rocking said latches from spring pressed engagement with a given pair of said bosses whereby said arms and wheels may be positionally shifted for use.

2. In a hand truck of the character described, a frame having sides formed of closed loops of metal including remainder rail portions extending from one of the ends thereof, a plate fixedly secured to each of the lower inner faces of said frame including said remainder rail portions, an under-carriage for said truck swingable to either of two use positions, said under-carriage comprising a pair of arms pivotally attached to said plates and having an axle shaft fixedly secured to the free ends thereof, and wheels on said axle, latches, lips upon the ends of said latches, a shaft carried by said arms and rigidly secured to said latches adjacent said arms, paired bosses on said plates, said latches being adapted to engage alternate pairs of said bosses in sequence with movement of said arms upon pivotal movement of the said arms and wheels whereby said arms and wheels are retained in pre-determined functional use position, and spring means associated with each of said arms to resist disengagement of said latches and bosses in either of said use positions, said axle in one of the use positions thereof being swingable against the lower edge of said plates whereby a load on the frame of the truck is translated through said plates to said axle and wheels, and a manually controlled lever secured to said shaft adapted to rock said shaft whereby said latches are released from engagement with a pair of said bosses whereby the arms, axle and wheels thereon may be swung to and from either of said use positions.

3. A hand truck formed with a frame comprising a pair of parallel rails each having a looped end and having an end inturned upon itself so as to leave a forwardly extending remainder portion, a face plate welded upon each of the inner sides of said frame including the related remainder rail portion, a toe plate, said toe plate being fixedly positioned upon said face plates and to said frame, a pair of arms, one end of each of said arms being pivoted to a corresponding face plate, an axle shaft securing the free ends of said arms whereby provision is had for load supporting wheels, each of said face plates bearing directly upon said axle in support of a load thereon, bosses upon each of said face plates, said bosses being grouped in a forward pair and a rearward pair thereof, latching devices, said latching devices being adapted to engage an alternate pair of said pairs of bosses, said latching devices being positioned on and adjacent said arms for movement therewith, a spring carried by each of said arms and connected to a latching device thereon, said spring being arranged for repression of the related latching device during engagement with said bosses, said latches having equally and oppositely disposed lips so positioned thereon as to receive like disposed one of said bosses so as to stabilize the position of said wheels with respect to said frame, and means operably connected with said latching devices and operable to effect latching and unlatching of said swingable arms and wheels whereby the center of gravity of a load upon said truck may be altered.

4. In a hand truck, a frame therefor, said frame including a pair of side rails, each of said side rails being formed of a single piece of tubing reversely bent upon itself so as to form an upper first rail and a lower second rail in spaced parallel position, said second ral being inturned upon the first rail so as to provide a forwardly extending remainder portion in the first rail, face plates upon said frame, a toe plate upon and connecting said face plates, rollers journalled upon said toe plate, a pair of arms, each arm of said pair being pivoted upon and swingable along the inner face of a corresponding face plate, a shaft secured to the free end of each of said arms, a wheel journalled on each end of said shaft, a pair of spaced bosses on each of the face plates forming movement limits for said arms, a rock shaft having its ends journalled in said arms and having a pair of spring centered latches fixedly secured on said rockshaft for interlocking with a selected pair of said pairs of bosses whereby said arms and wheels may be held in either of their extreme functional use positions, and a manually operable lever on said shaft adapted under manual pressure to rock said shaft and latches whereby a pair of bosses engaged by the latches are released so as to enable said arm and wheels to be swung to and from a selected use position.

STANLEY S. MILLEN.

REFERENCES CITED

The following references are of record in the file of this patent:

UNITED STATES PATENTS

| Number | Name | Date |
| --- | --- | --- |
| 2,417,553 | Jensen | Mar. 18, 1947 |
| 2,421,123 | Jensen | May 27, 1947 |